United States Patent [19]

Rosen

[11] 4,208,221

[45] Jun. 17, 1980

[54] STATOR CORE STRIPPING

[75] Inventor: Shelvin Rosen, Sidney, Ohio

[73] Assignee: Copeland Corporation, Sidney, Ohio

[21] Appl. No.: 966,277

[22] Filed: Dec. 4, 1978

[51] Int. Cl.$^2$ .............................................. B08B 3/00
[52] U.S. Cl. .................................. 134/19; 29/403.4; 29/762; 134/30; 134/31
[58] Field of Search ...................... 134/14, 19, 30, 31; 29/403, 762

[56] References Cited

U.S. PATENT DOCUMENTS

| 3,342,638 | 9/1967 | Wanzenberg ..................... 134/19 X |
| 4,016,639 | 4/1977 | Dombrowski et al. ................. 29/762 |

*Primary Examiner*—Richard V. Fisher
*Attorney, Agent, or Firm*—Harness, Dickey & Pierce

[57] ABSTRACT

A stator comprising a core, wire and hydrolyzable insulation is contacted with steam under conditions of elevated pressure and temperature for a time sufficient to degrade the insulation whereupon the wire is mechanically separated from the stator core without damage to the core.

10 Claims, No Drawings

STATOR CORE STRIPPING

BACKGROUND AND SUMMARY OF THE INVENTION

The present invention relates to a method of salvaging stator cores. More specifically, this invention relates to a method of stripping magnet wire from stator cores having wedge, slot inner or wire insulation which is of a hydrolyzable nature.

Conventionally, stator cores are salvaged for recycling by stripping wire therefrom by one of two methods. In one method the wire is stripped from the stator core by simply pulling the wire from the core. In another method the stator is "burned" at about 400° C. to 500° C. for several hours to pyrolyze the wire enamel, varnish coatings and adhesives, slot liners, wedge and other insulation materials, and then the wire is pulled from the core. Neither method is entirely satisfactory, however, as the first method often results in broken wires which increases the difficulties attendant to their removal from the core, while the second method frequently causes deleterious changes in the electric characteristics of the stator core preventing its reuse. Also, some cores have residual oil or refrigerant which, when burned, degrade and result in even worse core degradation.

Wherefore, it is an object of this invention to provide an improved method for stripping stators. More specifically, it is an object of the present invention to provide a practical and economical process for stripping magnet wire from a stator core while substantially avoiding alteration of the electrical characteristics of the core so that the core can be salvaged for reuse. Another object of this invention is to provide a method for stripping magnet wire from a stator which requires less energy and less time than conventional "burning" techniques. Still another object of this invention is to provide a method of stripping magnet wire from a stator which avoids physical damage to the stator core.

These and other objects are achieved by the present invention wherein a stator comprising a core, magnet wire, and hydrolyzable insulation is contacted with steam under conditions of elevated temperature and pressure and for a time sufficiently great to cause degradation of said insulation but insufficient to cause deleterious side effects or damage to the stator core. Preferably, a stator is held in an environment of steam below the saturation pressure of the steam and at a temperature of from about 200° to 350° C. and an absolute pressure of from about 1,000 mm. to about 10,000 mm. Hg. After the insulation has degraded, the magnet wire is easily removed from the stator core as by pulling it or otherwise mechanically removing it therefrom.

DETAILED DESCRIPTION OF THE INVENTION

In accordance with the present invention it has been found that magnet wire can be stripped from a stator and the stator core salvaged for reuse by a method wherein a stator comprising a core, magnet wire and hydrolyzable insulation material is contacted with steam at an elevated pressure and temperature for a time period sufficient to cause degradation of the insulation material. Preferably, the steam has a temperature of from about 200° C. to about 350° C. and a pressure of from about 1,000 mm. to about 10,000 mm. Hg. Unless otherwise indicated, all temperatures and pressures herein are in degrees centigrade and millimeters (absolute), respectively. The stator is held in the steam environment for a time sufficiently long to degrade the insulation but insufficient to cause damage to the stator core. Then, the magnet wire is easily mechanically removed, for example, by pulling it from the core.

Stators suitable for use in the present process are those having insulation material which is subject to hydrolysis. Polyester such as Mylar ® by E. I. Dupont de Nemours and Co., nylon such as Nomex ® by E. I. Dupont de Nemours and Co., and cellulose are among the insulation materials susceptible to this process. It will be appreciated by those skilled in the art that the hydrolyzable insulation material can be slot liner, wedge or wire insulation.

The steam environment can be provided, for example, by injecting steam or liquid water which will convert to steam into an enclosure having a stator or stators therein and having temperature and pressure conditions as set forth above. Alternatively, a stator or stators can be heated in an enclosure which also contains a quantity of water in liquid form which will convert to steam as the temperature increases inside the enclosure. Preferably, the stators are sufficiently hot when subjected to the steam environment to avoid undesirable condensation of steam on the surface of the stator. In general, the stator surfaces should have a temperature greater than the saturation temperature of the steam when contacted therewith and the steam should be dry steam.

Equipment readily available and suitable for use in the present invention is conventional and will be apparent to those skilled in the art. For example, a household pressure cooker can be used at the low pressure limit of 1,000 mm. mercury. Other large equipment such as an elongated tube having a heating means and closed ends will be more practical for use in a commercial process.

By the term "degrade" is meant that the insulation loses a substantial portion of its mechanical strength. In the present process, the insulation becomes embrittled to the extent that it loses its cohesiveness and crumbles or powders. Hence, when the magnet wire is pulled from the stator, the wire is easily separated therefrom. Obviously, the exact time period during which the stator cores are held in the steam environment will vary with the size of the stator, the thickness and type of insulation, the temperature of the core (insulation), and pressure of the steam. Further application of suitable times and temperature and pressure conditions will be obtained from the examples which follow to illustrate this invention.

EXAMPLE 1

A stator comprising a core, wire and hydrolyzable wedge and slot liner insulation consisting of 10 mil polyester film (Maylar ® type A) is placed in an enclosure, heated to 200° C. and steam is injected and maintained at 1,000 mm. Hg. pressure and 200° C. for about 5.3 hours. After about 6 hours, examination of the insulation shows it to be moderately brittle and the magnet wire is easily pulled from the stator.

EXAMPLE 2

A stator similar to that of Example 1 is heated to 200° C. and then held in an environment of steam at 10,000 mm. Hg. The insulation is moderately brittle in about 0.2 hours and the magnet wire is easily pulled from the stator.

EXAMPLE 3

A stator similar to that of Example 1 is heated to 300° C. and held in an environment of steam at 1,000 mm. Hg. pressure for 0.5 hours whereupon the magnet wire is easily pulled from the stator.

EXAMPLE 4

A stator of Example 1 is heated to 300° C. and held in an environment of steam at 10,000 mm. Hg. for 0.01 hours whereupon the magnet wire is easily pulled from the stator.

What is claimed is:

1. A method of stripping wire from a stator having a core, wire, and hydrolyzable insulation, comprising the steps of contacting said stator with steam under conditions of elevated temperature and pressure and for a time sufficient to cause degradation of said insulation but insufficient to cause deleterious side effects or damage to the stator core, and then removing said wire from said stator.

2. The method of claim 1 wherein said conditions of elevated temperature and pressure are from about 200° C. to about 350° C. and from about 1,000 mm. Hg. to about 10,000 mm. Hg. respectively.

3. The process of claim 1 wherein said insulation comprises a material selected from a group consisting of polyester, nylon and cellulose.

4. The method of claim 1 wherein said steam environment is provided by injecting steam into an enclosure containing said stator.

5. The method of claim 1 wherein said steam environment is generated from liquid water in an enclosure containing said stator, the interior of said enclosure being maintained under temperature and pressure conditions such that said water is converted into steam inside said enclosure.

6. The method of claim 5 wherein said liquid water is injected into said enclosure.

7. The method of claim 1 including the step of heating the surface of said stator to a temperature greater than the saturation temperature of said steam prior to contacting said stator with said steam.

8. The method of claim 7 wherein said insulation comprises a material selected from the group consisting of polyester, nylon and cellulose material.

9. A method of stripping wire from a stator comprising a core, wire and hydrolyzable insulation comprising the steps of:

(A) heating said stator and holding said stator in an environment of steam under a pressure of from about 1,000 mm. to about 10,000 mm. Hg. and a temperature of about 200° C. to about 350° C. and for a time sufficient to effect a substantial reduction in the mechanical strength of said insulation, the temperature of said stator being above the saturation temperature of said steam during said holding; and (B) removing said wire from said core.

10. The method of claim 9 wherein said insulation comprises a material selected from the group consisting of polyester, nylon and cellulose material.

* * * * *

UNITED STATES PATENT AND TRADEMARK OFFICE
CERTIFICATE OF CORRECTION

PATENT NO. : 4,208,221

DATED : June 17, 1980

INVENTOR(S) : Shelvin Rosen

It is certified that error appears in the above-identified patent and that said Letters Patent are hereby corrected as shown below:

Column 1, line 9: "inner" should be —liner—

Column 2, line 22: after "which" insert —water—

Column 2, line 34: "large" should be —larger—

Signed and Sealed this

Nineteenth Day of August 1980

[SEAL]

Attest:

SIDNEY A. DIAMOND

Attesting Officer

Commissioner of Patents and Trademark